(12) United States Patent
Hubbell et al.

(10) Patent No.: US 11,697,372 B1
(45) Date of Patent: Jul. 11, 2023

(54) SYSTEM AND METHOD FOR ENHANCING SITUATIONAL AWARENESS IN A TRANSPORTATION VEHICLE

(71) Applicant: Spirited Eagle Enterprises, LLC, Farmington, MI (US)

(72) Inventors: Jerry K. Hubbell, Farmington, MI (US); Alan C. Lesesky, Charlotte, NC (US)

(73) Assignee: Spirited Eagle Enterprises, LLC, Farmington, MI (US)

( * ) Notice: Subject to any disclaimer, the term of this patent is extended or adjusted under 35 U.S.C. 154(b) by 0 days.

(21) Appl. No.: 17/851,322

(22) Filed: Jun. 28, 2022

Related U.S. Application Data

(63) Continuation of application No. 17/385,425, filed on Jul. 26, 2021, now abandoned, which is a
(Continued)

(51) Int. Cl.
*B60R 1/00* (2022.01)
*H04N 7/18* (2006.01)
(Continued)

(52) U.S. Cl.
CPC .............. *B60R 1/00* (2013.01); *G01S 13/931* (2013.01); *G08G 1/163* (2013.01); *H04N 7/183* (2013.01);
(Continued)

(58) Field of Classification Search
CPC .......... B60R 1/081; B60R 1/00; B60R 1/006; B60R 1/06; B60R 1/0605; B60R 1/07; B60R 1/08; B60R 1/082; B60R 16/023; B60R 2300/802; B62D 49/0614; G02B 5/09; G02B 5/10; H04B 7/26
See application file for complete search history.

(56) References Cited

U.S. PATENT DOCUMENTS 6,359,647 B1 * 3/2002 Sengupta ......... G08B 13/19641
348/E7.086
6,768,868 B1 * 7/2004 Schnell .................. G03B 17/00
396/424
(Continued)

FOREIGN PATENT DOCUMENTS

WO WO2005004466 1/2005

*Primary Examiner* — Thomas Ingram
(74) *Attorney, Agent, or Firm* — Schwartz Law Firm, P.C.

(57) ABSTRACT

A method for enhancing situational awareness in a transportation vehicle including combination tractor and a trailer. The method includes locating a plurality of cameras on the trailer of the vehicle. Each camera is equipped with a camera wash system including a wash nozzle, dryer, and defroster. The cameras are operatively connected to a local area user network via an onboard access point. The onboard access point communicates with a data bus of the vehicle. At vehicle start-up, the cameras are automatically paired with a computing device located inside the tractor. The computing device includes a display screen and graphical interface with icon tabs representing each of the connected cameras. Using the icon tabs rendered on the display screen of the computing device, a selected camera and associated camera wash system can be manually activated.

1 Claim, 10 Drawing Sheets

Related U.S. Application Data continuation of application No. 17/062,112, filed on Oct. 2, 2020, now abandoned, which is a continuation of application No. 16/287,270, filed on Feb. 27, 2019, now abandoned, which is a continuation of application No. 15/685,292, filed on Aug. 24, 2017, now abandoned, which is a continuation of application No. 13/343,385, filed on Jan. 4, 2012, now abandoned.

(60) Provisional application No. 61/626,017, filed on Sep. 19, 2011, provisional application No. 61/460,546, filed on Jan. 4, 2011.

(51) Int. Cl.
*G08G 1/16* (2006.01)
*G01S 13/931* (2020.01)

(52) U.S. Cl.
CPC ... *B60R 2300/205* (2013.01); *B60R 2300/301* (2013.01); *B60R 2300/304* (2013.01); *B60R 2300/802* (2013.01); *G01S 2013/932* (2020.01)

(56) References Cited

U.S. PATENT DOCUMENTS

| | | | |
|---|---|---|---|
| 7,110,570 B1 | 9/2006 | Berenz et al. | |
| 7,881,496 B2* | 2/2011 | Camilleri | G06V 20/588 348/148 |
| 8,271,662 B1* | 9/2012 | Gossweiler, III | H04M 1/6066 709/227 |
| 8,458,800 B1 | 6/2013 | Van Voorhees et al. | |
| 8,519,571 B2* | 8/2013 | Yoshida | H02G 3/0462 307/147 |
| 8,520,070 B1* | 8/2013 | Englander | H04N 5/77 348/148 |
| 8,606,933 B1* | 12/2013 | Gossweiler, III | H04M 1/6066 709/227 |
| 10,093,284 B2* | 10/2018 | Hsiao | B60S 1/485 |
| 10,146,049 B2* | 12/2018 | Moncino | G02B 27/00 |
| 10,604,120 B2* | 3/2020 | Newman | G02B 27/0006 |
| 10,696,277 B1* | 6/2020 | Rakouki | B60S 1/56 |
| 2002/0005440 A1* | 1/2002 | Holt | B05B 15/652 239/284.2 |
| 2004/0100380 A1 | 5/2004 | Lindsay et al. | |
| 2004/0139328 A1* | 7/2004 | Grinberg | H04L 63/0823 713/182 |
| 2004/0145457 A1* | 7/2004 | Schofield | B60Q 3/258 340/425.5 |
| 2004/0161133 A1* | 8/2004 | Elazar | G08B 13/19615 382/115 |
| 2004/0184168 A1 | 9/2004 | Murray | |
| 2004/0233284 A1 | 11/2004 | Lesesky et al. | |
| 2005/0007054 A1* | 1/2005 | Kim | B60S 1/0818 318/483 |
| 2005/0254656 A1* | 11/2005 | Rose | H04L 9/0894 380/277 |
| 2006/0069478 A1* | 3/2006 | Iwama | B62D 15/028 701/1 |
| 2006/0132944 A1 | 6/2006 | Matsuura et al. | |
| 2007/0088488 A1 | 4/2007 | Reeves | |
| 2007/0136078 A1* | 6/2007 | Plante | G07C 5/008 348/148 |
| 2008/0212215 A1* | 9/2008 | Schofield | B60C 23/00 345/173 |
| 2010/0225738 A1* | 9/2010 | Webster | B60R 11/04 348/36 |
| 2011/0068911 A1* | 3/2011 | Nix | B60R 1/00 348/E5.057 |
| 2011/0166690 A1 | 7/2011 | Ternus et al. | |
| 2011/0210831 A1* | 9/2011 | Talty | H04W 4/21 340/10.51 |
| 2011/0319016 A1* | 12/2011 | Gormley | G06F 1/1694 455/41.1 |
| 2012/0117745 A1* | 5/2012 | Hattori | B60S 1/54 134/198 |
| 2012/0326889 A1* | 12/2012 | Kabler | G01S 7/4806 340/905 |
| 2013/0009760 A1* | 1/2013 | Washlow | G01C 21/3415 340/425.5 |
| 2014/0139669 A1* | 5/2014 | Petrillo | B60R 1/00 348/148 |
| 2016/0006922 A1* | 1/2016 | Boudreau | B60R 1/00 348/207.1 |
| 2016/0272164 A1* | 9/2016 | Hsiao | B60S 1/52 |

* cited by examiner

SYSTEM AND METHOD FOR ENHANCING SITUATIONAL AWARENESS IN A TRANSPORTATION VEHICLE

TECHNICAL FIELD AND BACKGROUND OF THE INVENTION

This disclosure relates broadly and generally to a system and method for enhancing driver situational awareness in a transportation vehicle. Other embodiments and implementations of the present disclosure may be applicable in completing visual systems and parts inspections, cargo inspections, trailer inspections, vehicle operation monitoring, security surveillance, driver performance monitoring, safety checks, and others—all done by the driver from within the cab or by an administrator from a remote location. The present example of the invention, discussed further herein, involves technology and methodology for enhancing driver situational awareness by increasing viewing areas within and surrounding the vehicle. The ability to "see" within and around the vehicle is of fundamental importance for any driver. This is particularly evident when lane changing/merging, turning and cornering, backing-up, starting forward movement, passing beneath overhead structures, and other such maneuvers.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a method for enhancing situational awareness of a vehicle driver, passenger, or remote user outside of the vehicle. The term "situational awareness" refers broadly herein to a knowledge, understanding, or consciousness of the state or condition of the environment, events, or circumstances within or around the transportation vehicle. The method includes strategically locating a plurality of (digital or analog) sensory communication devices on the vehicle. The sensory communication devices are operatively connected (e.g., wireless or hardwired) to a user network via an onboard access point. At least one of the sensory communication devices is activated upon a triggering event. A vehicle data signal comprising realtime vehicle information is transmitted from the activated sensory communication device to the user network. Using a computing device, a user accesses the network to receive the realtime vehicle information transmitted by the activated sensory communication device. In one exemplary embodiment, the sensory communication devices reside in a normal sleep mode, and awaken only upon occurrence of the predetermined triggering event. The triggering event may awaken only certain "targeted" (or user-specified) sensory communication devices.

The sensory communication devices (e.g., video cameras) may be strategically located within and about interior and exterior portions of the vehicle including, for example, inside and outside the vehicle trailer, the front grille, front and rear fenders, mirror housings, top of front windshield inside vehicle cab, top of roof outside vehicle cab, and other desired points. Infrared lighting may also be used in dark conditions.

According to another exemplary embodiment, the triggering event comprises at least one of a group consisting of activating a vehicle turn signal, activating headlights, turning a steering wheel of the vehicle, vehicle braking, vehicle acceleration, vehicle speed, airbag deployment, and vehicle collision.

According to another exemplary embodiment, the triggering event comprises moving the vehicle transmission to a predetermined gear (e.g., reverse, park, neutral, etc.).

According to another exemplary embodiment, the triggering event comprises the presence and detection of motion or obstacles in or around the vehicle. In this embodiment, the vehicle may include strategically located motion and distance sensors.

According to another exemplary embodiment, at least one of the sensory communication devices comprises a video camera.

According to another exemplary embodiment, at least one of the sensory communication devices comprises a microphone for transmitting realtime audible sound.

According to another exemplary embodiment, at least one of the sensory communication devices comprises a CCTV.

According to another exemplary embodiment, at least one of the sensory communication devices comprises an IP-based digital still camera.

According to another exemplary embodiment, the computing device comprises a tablet computer with an integrated display screen.

According to another exemplary embodiment, the computing device comprises a web-enabled smartphone.

According to another exemplary embodiment, connecting the sensory communication devices comprises enrolling the sensory communication devices on the user network in a secured online user account.

According to another exemplary embodiment, the method includes logging in to the user account via security password.

According to another exemplary embodiment, the method comprises recording and storing the realtime vehicle information transmitted by the activated sensory communication device using an onboard network-attached digital video recorder.

According to another exemplary embodiment, the method comprises recording and storing the realtime vehicle information transmitted by the activated sensory communication device using internal flash memory.

According to another exemplary embodiment, the method comprises recording and storing the realtime vehicle information transmitted by the activated sensory communication device to a remote server (as in the case of IP cameras).

According to another exemplary embodiment, the activated sensory communication device is automatically selected without user intervention.

According to another exemplary embodiment, the method comprises using Video Content Analysis (VCA) for automatically analyzing the realtime vehicle information transmitted by the activated sensory communication device.

According to another exemplary embodiment, the method comprises combining a plurality realtime vehicle data signal feeds of respective user networks in a single networked multi-user system.

According to another exemplary embodiment, the activated sensory communication device utilizes facial recognition technology for automatically verifying a driver of the transportation vehicle.

According to another exemplary embodiment, the computing device comprises application software for enabling a dashboard-centric interface with icon tabs for manually activating respective sensory communication devices on the user network, such that when the user clicks on an icon tab, the realtime vehicle information transmitted by the activated sensory communication device is output to the user.

According to another exemplary embodiment, the vehicle data signal accessed on the user network is encrypted using a cryptographic protocol.

According to another exemplary embodiment, the transportation vehicle comprises one selected from a group consisting of heavy duty tractors, trailers for heavy duty tractors, boat and other trailers, passenger vehicles, golf carts, all-terrain vehicles, recreational vehicles, military vehicles, trains, buses, aircraft, and watercraft.

In another exemplary embodiment, the disclosure comprises a computer-implemented system which utilizes a plurality of strategically located sensory communication devices for enhancing situational awareness in a transportation vehicle.

In yet another exemplary embodiment, the disclosure utilizes a plurality of strategically located sensory communication devices and comprises a computer program product including program instructions tangibly stored on a computer-readable medium and operable to cause a computing device to interface with the communication devices and perform a method for enhancing situational awareness in a transportation vehicle.

In still another exemplary embodiment, the disclosure utilizes a plurality of strategically located sensory communication devices and comprises a computer-readable storage medium storing computer-executable instructions, executable by processing logic of a computing device, including one or more instructions, that when executed by the processing logic, cause the processing logic to interface with the communication devices and perform a method for enhancing situational awareness in a transportation vehicle.

In still another exemplary embodiment, the disclosure comprises an article of manufacture comprising a computer-readable storage medium, and executable program instructions embodied in the storage medium that when executed by processing logic of a computing device causes the processing logic to perform a method for enhancing situational awareness in a transportation vehicle.

BRIEF DESCRIPTION OF THE DRAWINGS

Exemplary embodiments of the present invention will hereinafter be described in conjunction with the following drawing figures, wherein like numerals denote like elements, and wherein.

Figure 1:
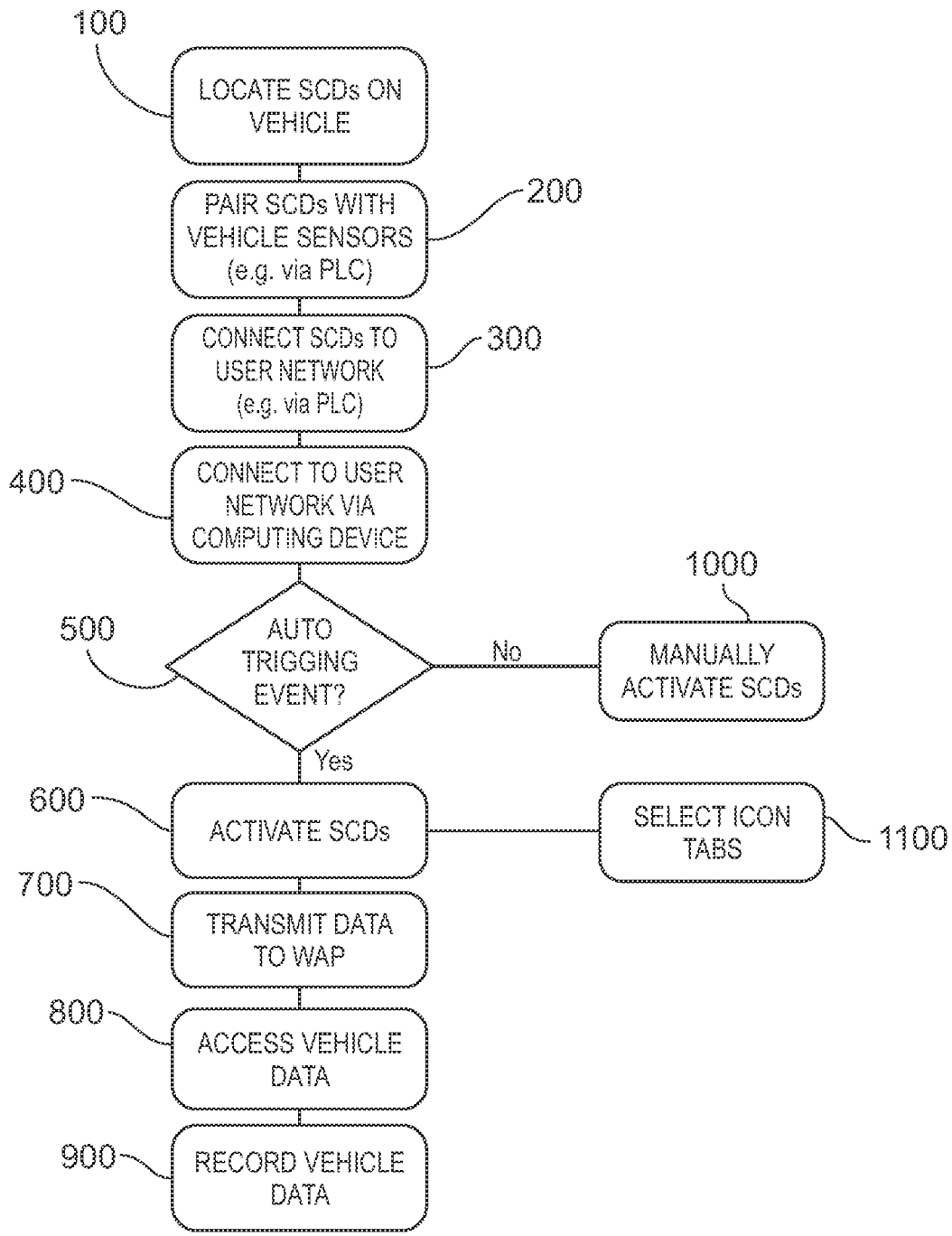
FIG. 1 is a flow diagram illustrating various steps of an exemplary method for enhancing situational awareness in a transportation vehicle according to the present disclosure.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise.

Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, FIGS. 1 and 2 discussed below illustrate various steps and features of the exemplary method according to one implementation of the present disclosure. The exemplary method is applicable for enhancing driver situational awareness in a transportation vehicle. Specific examples of the present disclosure are illustrated in FIGS. 3-10 and discussed further below. In alternative exemplary implementations, the present disclosure may be applicable in completing vehicle systems and parts inspections, cargo inspections, trailer inspections, vehicle operation monitoring, security surveillance, driver performance monitoring, safety checks, and others—all done by the driver from within the cab or by an administrator from a remote location.

As indicated at block 100 in FIG. 1, the exemplary method strategically locates a plurality of sensory communication devices ("SCDs") on the vehicle. The sensory communication devices may comprise one or more wireless CCTV video cameras, IP cameras, microphones, and other such devices (wireless or hardwired) adapted for capturing audio, video, and imagery data in and around the vehicle. The sensory communication devices may be web-enabled, and may comprise transceivers and flash memory for software upgrades, troubleshooting, and the like. Each of the sensory communication devices are operatively aligned or "paired" at block 200 with the vehicle data bus (e.g., power line carrier or "PLC") and one or more vehicle sensors including, for example, ABS braking sensors, vehicle turn signal sensors, headlight sensors, windshield wiper sensors, safety air bag sensors, transmission gear sensors, speedometer sensor, odometer sensor, clock sensor, steering wheel position sensor, sensors indicating position of tractor in relation to trailer, engine and ambient temperature sensors, distance and motion sensors, battery sensors, tire sensors, and others. The vehicle sensors may comprise or utilize transceivers, transmitters or other means for communicating their state or condition directly to respective paired sensory communication devices, or to a central onboard wireless access point (WAP) in the cab of the vehicle. The onboard access point cooperates with an onboard router and transceiver (or modem) to connect the sensory communication devices and vehicle sensors to a local area user network, as indicated at block 300. The modem may include bridge and/or repeater modes. The connected devices and/or sensors may be hardwired to the onboard access point via existing vehicle data bus (using technology described in prior U.S. Pat. No. 7,817,019), or may connect wirelessly using Wi-Fi, BLUETOOTH, WAVE, or related standards. The vehicle data bus may communicate with the access point, onboard recording devices, and vehicle subsystems such as ABS braking system, engine, transmission, and tire modules using SAE, ISO, or CAN standards (e.g., SAE J1708/1587, SAE J1939, SAE J1850, SAE J2497[PLC], and RS232). The complete disclosure of the aforementioned prior patent is incorporated by reference herein. The onboard access point may communicate with 30 or more sensory communication devices and vehicle sensors located within a radius of more than 100 m. Alternatively, the access point may be integrated with one of the onboard sensory communication devices or onboard vehicle sensors.

The user connects to the local area network at block 400 using a mobile (e.g., web-enabled) or dedicated computing device. The dedicated computing device may comprise a display permanently mounted or integrated within the vehicle cab. Examples of mobile computing devices include a laptop computer, Netbook, tablet computer, cellular telephone, smartphone, PDA, and others. In one exemplary implementation, the computing device automatically pairs with the sensory communication devices and vehicle sensors at vehicle start-up, and automatically connects the driver or other user to the network. Alternatively, in web-based implementations, the user may first be required to login to a designated user account with an authorization code, user ID, password, or the like. One specific example of a suitable mobile computing device is described further below. In the user network, the computing device, sensory communication devices, and vehicle sensors may communicate with each other via PLC (or other vehicle data base) and wireless mechanism (e.g., Wi-Fi, BLUETOOTH, WAVE) in a secured closed-loop system. Once connected to the user network, a software application (e.g., mobile app) provides a dashboard-centric graphical interface on a display screen with icon tabs representing each of the connected sensory communication devices and vehicle sensors. The sensory communication devices may also be manually activated, as indicated at block 1000. Manually clicking an icon tab for a particular device (e.g., video camera), as indicated at block 1100, provides a realtime view of the environmental area on which the camera is focused. The software application allows the user to drill down from the dashboard into the various network connected devices and sensors to make desired pairings and changes to existing pairings.

Figure 2:
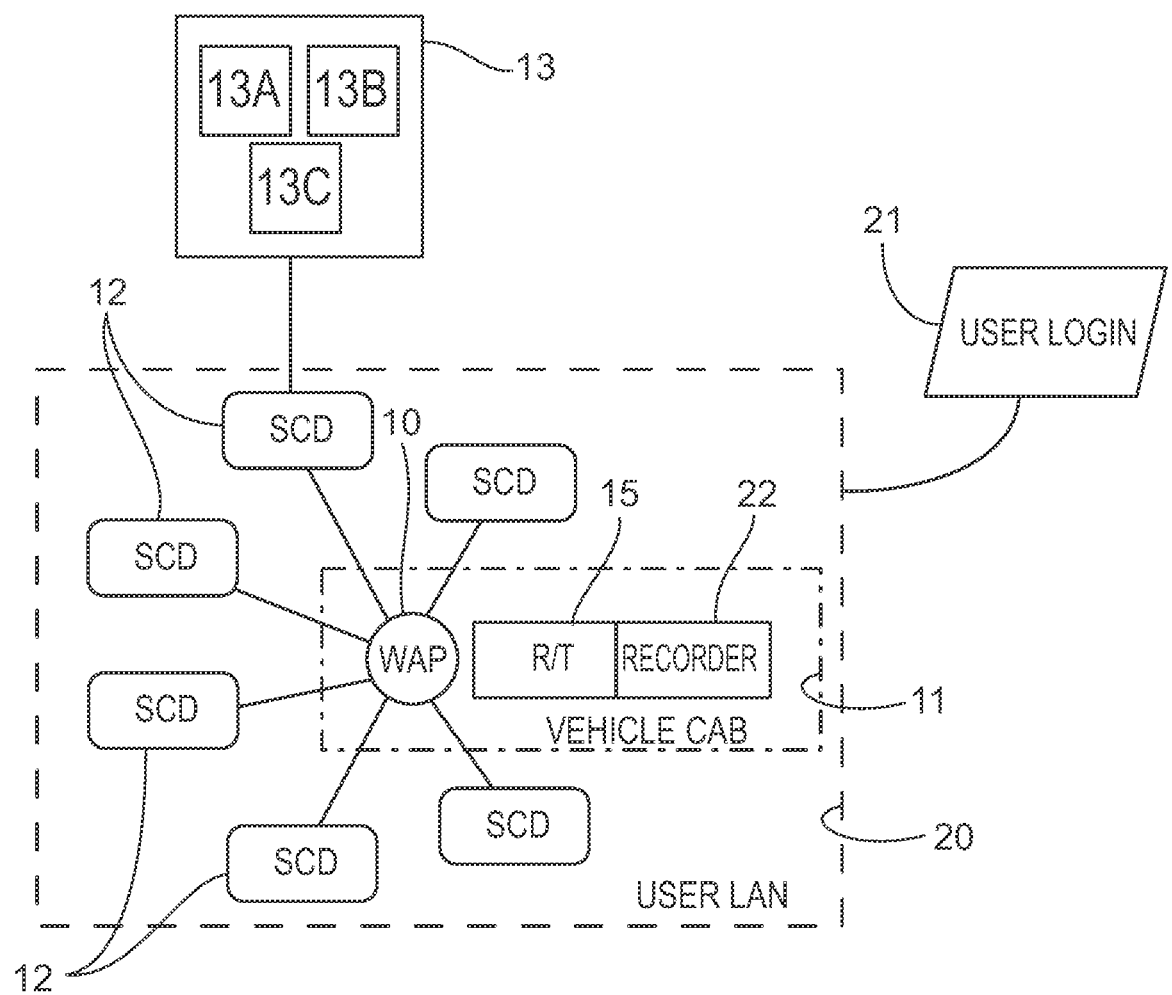
FIG. 2 is a schematic diagram showing various components and systems employed in the exemplary method.

Referring to FIG. 2 and blocks 500-900, an automatic triggering event occurs at block 500 when a particular vehicle sensor communicates a predetermined status to the access point 10—either automatically or manually by operation of the driver. For example, a triggering event may occur when the driver manually activates the right turn signal within the vehicle cab 11. This turn signal sensor may be operatively paired with one or more high-definition, IP-based CCTV video cameras 12 mounted outside the vehicle at or around a right side of the front cab and trailer. The exemplary video cameras 12 may have computer-controlled technologies and flash memory that allow them to identify, track, and categorize objects in their field of view. As indicated at block 600, this event causes the designated cameras 12 to automatically active (awaken from a normal sleep mode) and transmit a data signal comprising realtime streaming video to the onboard access point 10 at block 700. The access point 10 passes the data to the onboard router/transceiver 15 (or modem) where the realtime video is accessed on the user network 20, and automatically displayed to the driver on the screen of his computing device 21 at block 800. The CCTV cameras 12 may incorporate audio surveillance microphones for simultaneously transmitting environmental noises to the driver, and may also comprise Digital Video Recorders 22 for recording and storing the captured digital audio, video and images as indicated at block 900. Alternatively, the captured vehicle data may be recorded and stored on a remote server or on an onboard recorder, such as that described in prior U.S. Pat. No. 8,032,277—the complete disclosure of which is incorporated herein by reference. The CCTV cameras may also support recording directly to network-attached storage devices, and sufficient internal flash for completely stand-alone operation. For cameras 12 mounted outside the vehicle, the camera housing may be equipped with a camera wash system 13 comprising a wash nozzle 13A, dryer 13B, and defroster 13C—See FIG. 2. Other exemplary sensory communication devices may comprise closed circuit digital photography (CCDP), or other IP-based digital still cameras.

The exemplary CCTV cameras may also utilize Video Content Analysis (VCA) technology for automatically analyzing video to detect and determine temporal events not based on a single image. Using VCA the camera can recognize changes in the environment and identify and compare objects in a database using size, speed, and color. The camera's actions can be programmed based on what it is "seeing". For example, an alarm may be activated through the driver's computing device if the camera detects movement of cargo within the trailer. In other exemplary embodiments, the CCTV cameras may comprise a facial recognition system (computer application) for automatically identifying or verifying a driver from a digital image or a video frame from a video source. This may be accomplished by comparing selected facial features from the image and a facial database.

The individual user network in the exemplary implementation may be combined with other user networks, and centrally monitored and accessed using a network protocol called "Television Network Protocol." Each user network (LAN) is an integrated system allowing users at any location (outside the vehicle) to connect remotely from the Internet and view what their cameras are viewing remotely. All online communications may be encrypted using Transport Layer Security (TLS), Secure Socket Layer (SSL) or other cryptographic protocol.

Exemplary Mobile Computing Device and Software

The exemplary mobile computing device utilized by drivers in the present method may implement a computer program product (e.g., mobile app) comprising program instructions tangibly stored on a computer-readable medium, and operable to cause a computing device to perform a method for enhancing situational awareness in a transportation vehicle. The present disclosure further comprises a computer-readable storage medium storing computer-executable instructions, executable by processing logic of a computing device, including one or more instructions, that when executed by the processing logic, cause the processing logic to perform a method for enhancing situational awareness in a transportation vehicle. In yet another exemplary embodiment, the present disclosure comprises an article of manufacture including a computer-readable storage medium, and executable program instructions embodied in the storage medium that when executed by processing logic of a computing device causes the processing logic to perform a method for enhancing situational awareness in a transportation vehicle.

The computing device may incorporate or comprise any general or specific purpose machine with processing logic capable of manipulating data according to a set of program instructions. In one exemplary embodiment, the computing device comprises a mobile tablet such as the iPAD®2 by Apple Inc using iOS 4.3.3. Current product specifications for the iPAD®2 are copied below.

Display
  9.7-inch (diagonal) LED-backlit glossy widescreen Multi-Touch display with IPS technology
  1024-by-768-pixel resolution at 132 pixels per inch (ppi)
  Fingerprint-resistant oleophobic coating
  Support for display of multiple languages and characters simultaneously
iPad 2 Processor
  Apple A5 Processor
  1 GHz dual-core Apple A5 custom-designed, high-performance, low-power system-on-a-chip
iPad 2 Internal Memory/Storage Capacity
For both iPad Wi-Fi and iPad WiFi+3G:
  16 GB, 32 GB or 64 GB internal flash memory (or flash drive)
Wireless
  Wi-Fi (802.11a/b/g/n)
  Bluetooth 2.1+EDR technology The exemplary tablet includes card slots for removable flash and SIM cards, and may have up to 32 GB of non-volatile internal memory. One or more of the flash and SIM cards and internal memory may comprise computer-readable storage media containing program instructions applicable for effecting the present method for enhancing situational awareness in a transportation vehicle, described further below. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices. SD has an official maximum capacity of 2 GB, though some are available up to 4 GB.

The SIM card contains an integrated circuit that securely stores the service-subscriber key (IMSI) used to identify a subscriber on mobile devices including the exemplary tablet. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the tablet (or other mobile device), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's tablet (or other mobile device), a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number.

Other features of the exemplary tablet may include front-facing and rear-facing cameras, Dolby Digital 5.1 surround sound, video mirroring and video out support, built-in speaker and microphone, built-in 25-watt-hour rechargeable lithium-polymer battery, and sensors including three-axis gyro, accelerometer, and ambient light sensor.

The exemplary tablet may also combine A-GPS and other location services including Wi-Fi Positioning System and cell-site triangulation, or hybrid positioning system. Mobile device tracking tracks the current position of a mobile device, even when it is moving. To locate the device, it must emit at least the roaming signal to contact the next nearby antenna tower, but the process does not require an active call. GSM localisation is then done by multilateration based on the signal strength to nearby antenna masts. Mobile positioning, which includes location based service that discloses the actual coordinates of a mobile device bearer, is a technology used by telecommunication companies to approximate where a mobile device and thereby also its user (bearer), temporarily resides.

The exemplary tablet may incorporate a capacitive touchscreen. As generally know and understood in the art, capacitive touchscreens tend to be more accurate and responsive than resistive screens. Because they require a conductive material, such as a finger tip, for input, they are not common among (stylus using) Tablet PCs but are more prominent on the smaller scale tablet computer devices for ease of use, which generally do not use a stylus, and need multi-touch capabilities. In alternative embodiments, the tablet may comprise a resistive touchscreen. Resistive touchscreens are passive and can respond to any kind of pressure on the screen. They allow a high level of precision (which may be needed, when the touch screen tries to emulate a mouse for precision pointing, which in Tablet personal computers is common). Because of the high resolution of detection, a stylus or fingernail is often used for resistive screens. The exemplary touchscreen technology may also include palm recognition, multi-touch capabilities, and pressure sensitive films.

Exemplary Implementations of the Present Method

Figure 3:
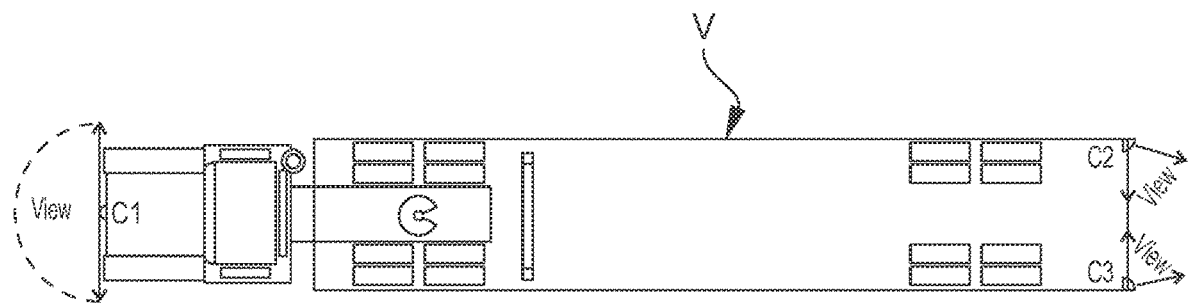
FIG. 3 illustrates an exemplary implementation of the present method for vehicle parts and system inspection.
Figure 3:
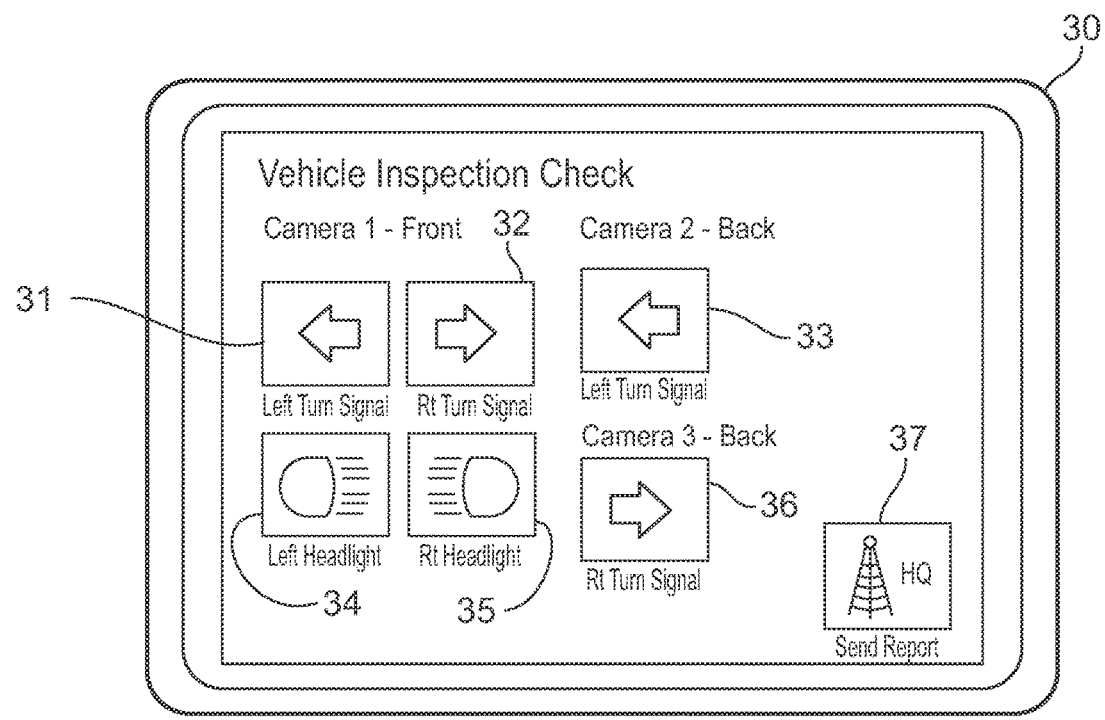

In the example illustrated in FIG. 3, multiple CCTV video cameras C1, C3, C3 are mounted to the vehicle "V" at rear corners of the trailer and above the front grille. The front (panoramic) camera C1 is operatively paired with vehicle sensors for the left/right turn signals and headlights, while the two rear cameras are paired only with the turn signals. The front and rear cameras C1, C2, C3 automatically activate, as described above, upon use of the turn signals. The front camera C1 automatically activates upon activation of the front headlights. When the cameras are activated, the driver's tablet computer 30 streams realtime video (or displays a still photograph) of the areas within view of the cameras. In this example, a vehicle inspection check may be performed by the driver or remote user by manually clicking the various icon tabs 31-36 signaling the associated turn signals and headlights to activate, thereby activating the paired cameras C1-C3 and verifying their proper operation on the tablet display screen 30. This vehicle data may be captured and stored, and transmitted to a remote headquarters location by clicking icon tab 37.

Figure 4:
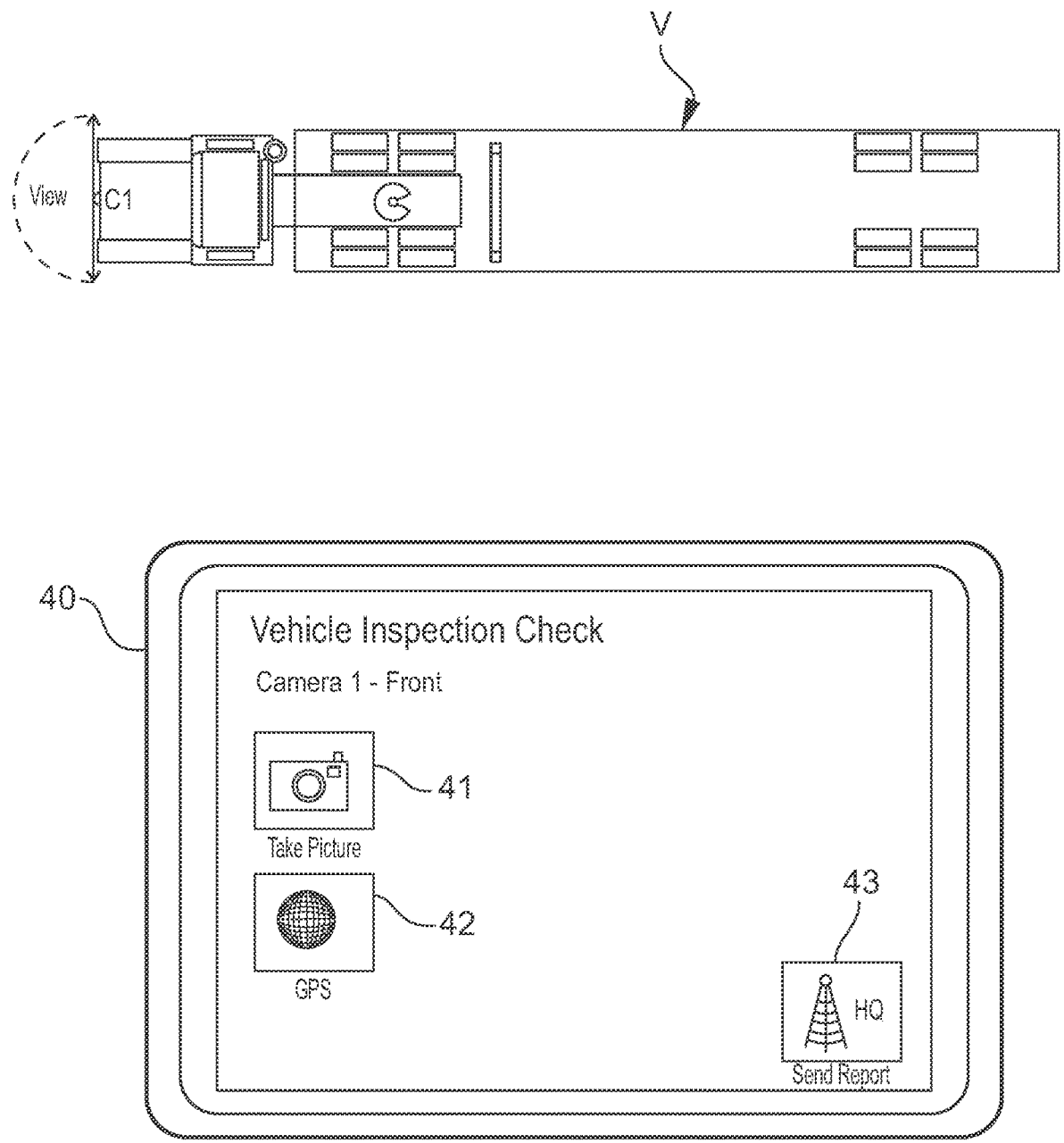
FIG. 4 illustrates an exemplary implementation of the present method for documenting vehicle arrival and location.

In the example of FIG. 4, a panoramic CCDP digital still camera C1 is mounted to the vehicle "V" above the front grille. The camera C1 is operatively paired with a vehicle sensor for the transmission "park" gear. When the driver moves the vehicle transmission from any other gear into park the camera C1 automatically activates and captures a digital still photograph of the truck location. Using the driver's tablet computer 40, the digital photograph is time and date stamped by clicking icon tab 41, and displayed in realtime to the driver (or other user) on the tablet display screen. A GPS icon tab 42 may also be clicked by the driver (or other user) to display and record the exact coordinates of the vehicle location. This vehicle data may be captured and stored, and transmitted to a remote headquarters location by clicking icon tab 43.

Figure 5:
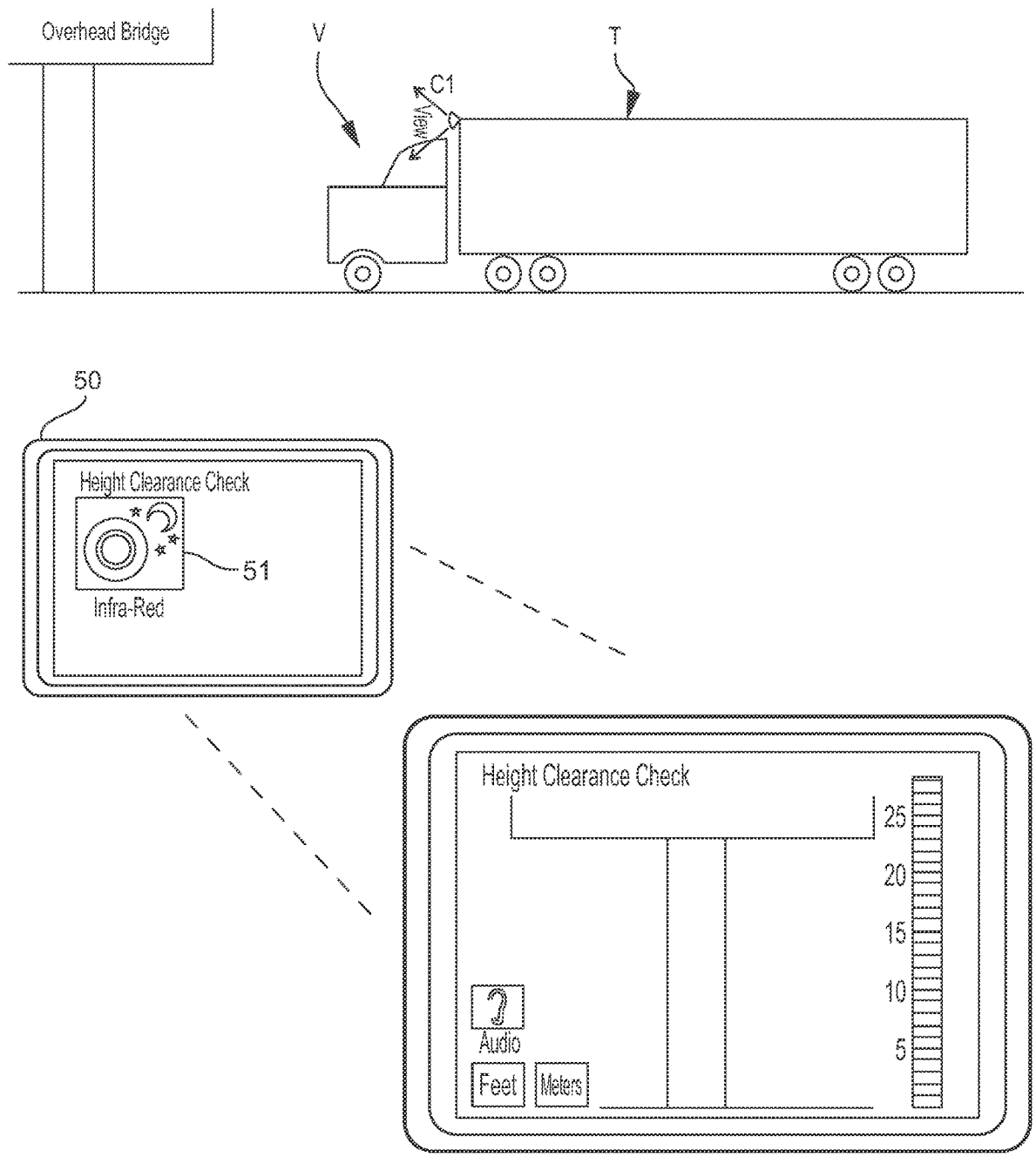
FIG. 5 illustrates an exemplary implementation of the present method for providing height clearance confirmation.

In the example of FIG. 5, a CCTV video camera C1 with infrared viewing is mounted at a front top location on the vehicle trailer "T". As the vehicle "V" approaches an underpass, onboard GPS technology and distance sensors cooperate to automatically activate the camera C1. Using the tablet computer 50, a "height clearance check" is displayed in realtime to the driver (or other user) on the tablet display screen. Alternatively, the height clearance may be confirmed with a spoken announcement from the tablet's integrated audio system. This camera may also be manually activated by clicking an icon tab 51 on the tablet's display screen.

Figure 6:
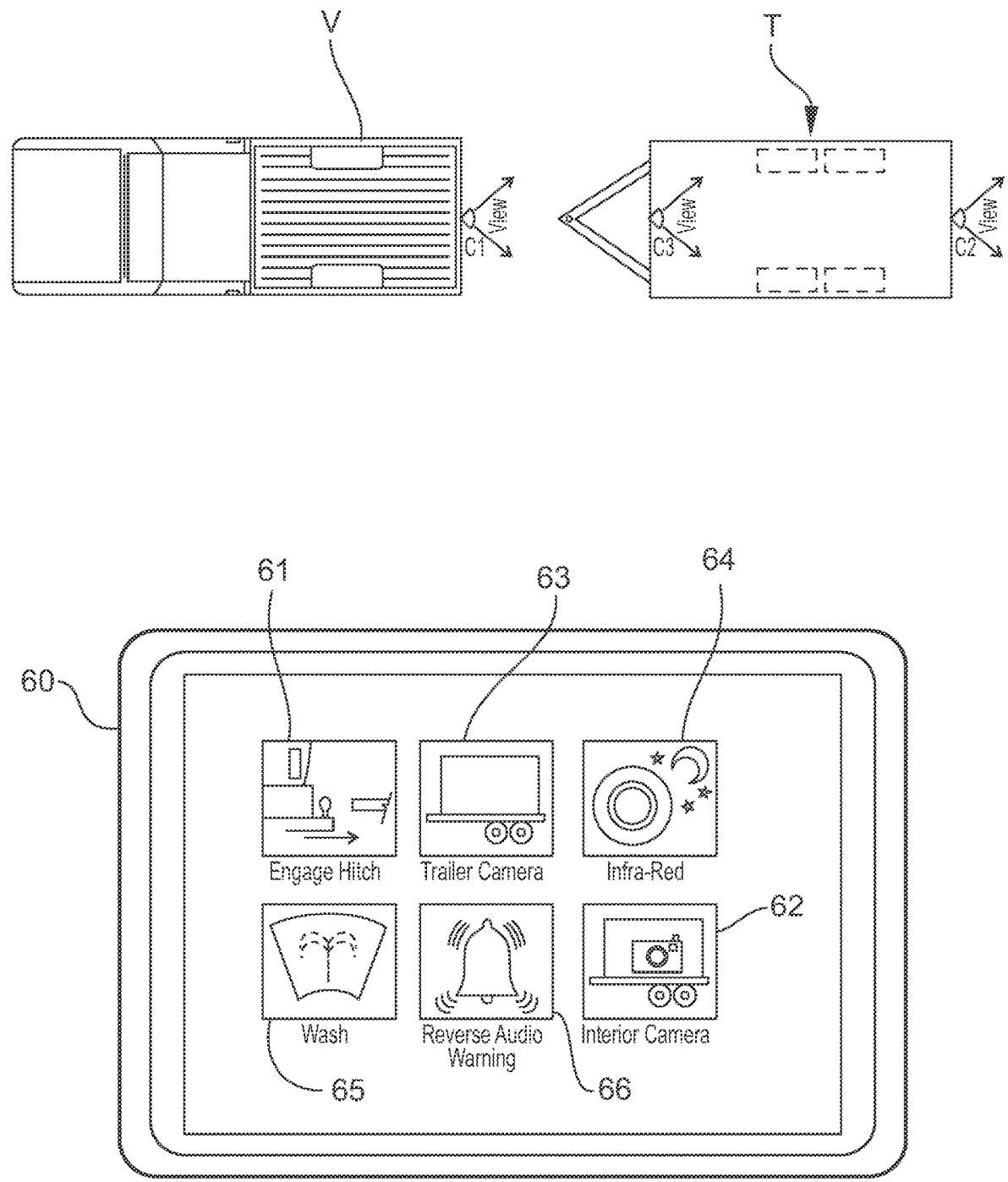
FIG. 6 illustrates an exemplary implementation of the present method to assist with a vehicle hitch connection.

In the example of FIG. 6, a CCTV video camera C1 is mounted proximate a trailer hitch of the vehicle "V". As the vehicle approaches the trailer "T", a distance sensor automatically activates the camera C1 and displays a rearward viewing area in realtime to the driver (or other use) on the tablet display screen of tablet 60. Alternatively, the camera may be automatically activated upon movement of the vehicle transmission into the reverse gear. Additional CCTV video cameras C2, C3 may be located inside the trailer and at a rear of the trailer. Each camera may be selectively manually activated by clicking an icon tab 61, 62, 63 on the tablet's display screen. Additional icon tabs 64, 65, 66 may be provided and clicked to enable infrared viewing, to activate a camera wash system, and to emit a reverse audio warning.

Figure 7:
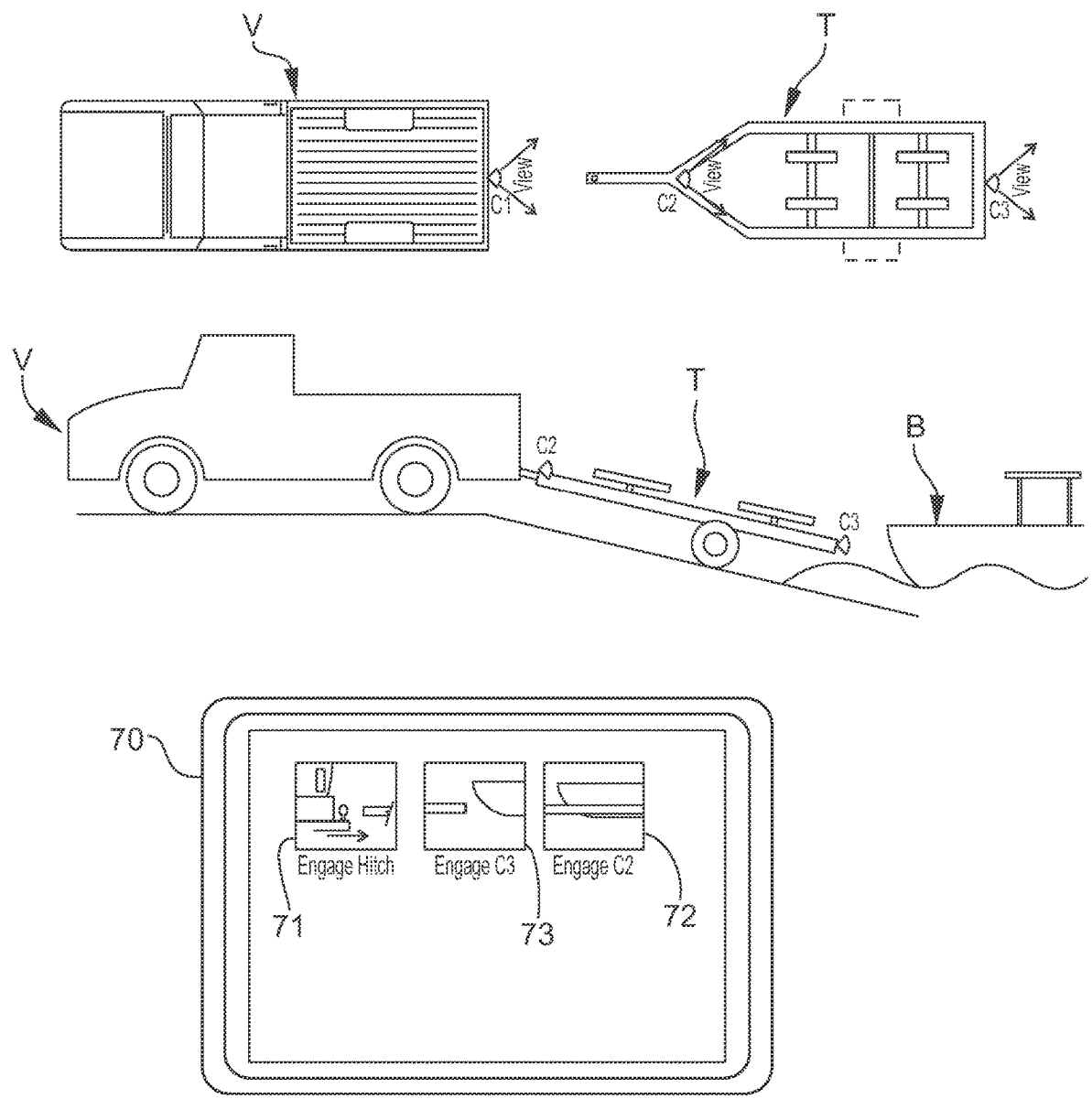
FIG. 7 illustrates an exemplary implementation of the present method to assist with boat trailer hitch connection and trailer loading.

In the example of FIG. 7, a CCTV video camera C1 is mounted proximate a trailer hitch of the vehicle "V". As the vehicle approaches a boat trailer "T", a distance sensor automatically activates the camera C1 and displays a rearward viewing area in realtime to the driver (or other user) on the display screen of tablet 70. Alternatively, the camera C1 may be automatically activated upon movement of the vehicle transmission into the reverse gear. Additional waterproof IP-based cameras C2, C3 may be located at the front and rear of the boat trailer "T" to confirm that the boat "B" is properly loaded and secured on the trailer. Each camera C1, C2, C3 may be selectively manually activated by clicking an icon tab 71, 72, 73 on the tablet's display screen.

Figure 8:
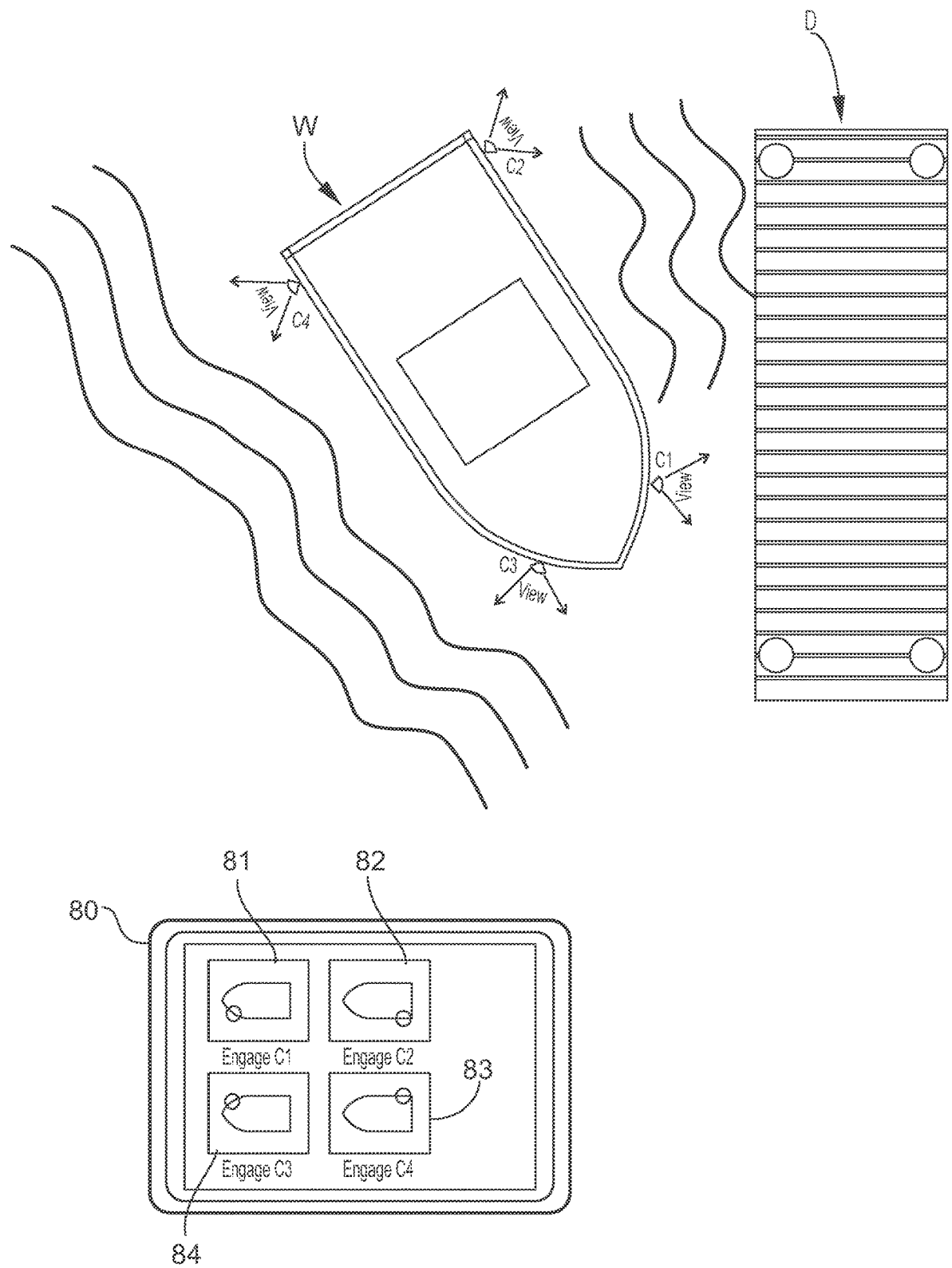
FIG. 8 illustrates an exemplary implementation of the present method to assist with boat docking and maneuvering.

In the example of FIG. 8, multiple spaced waterproof IP-based video cameras C1, C2, C3, and C4 are mounted proximate the bow, stern, and port and starboard sides of a watercraft "W". As the watercraft "W" approaches a dock or slip "D", one or more distance sensors automatically activate one or more of the cameras C1-C4 and displays the associated viewing area in realtime to the driver (or other user) on the display screen of tablet 80. Each camera C1-C4 may also be selectively manually activated by clicking an icon tab 81, 82, 83, 84 on the tablet's display screen.

Figure 9:
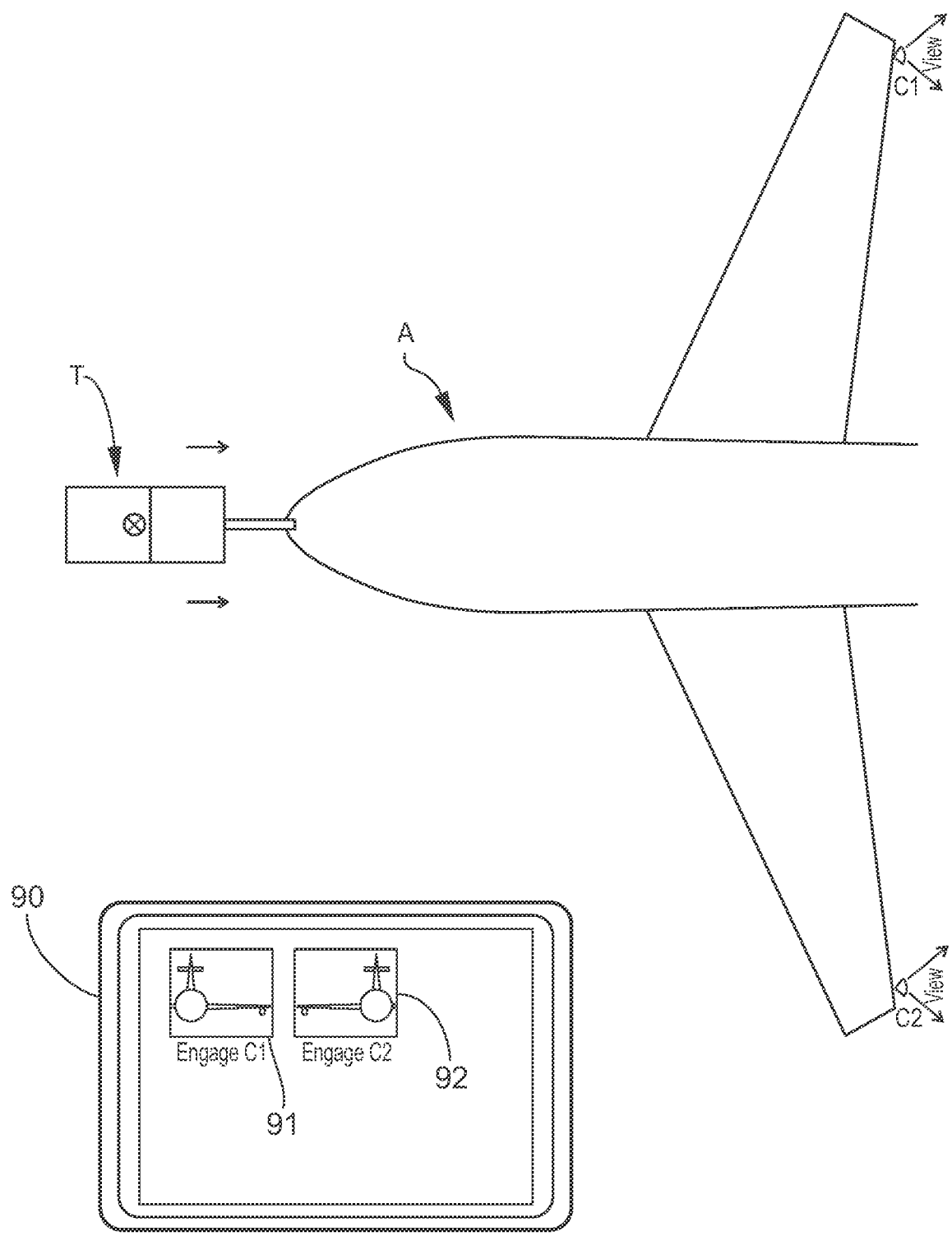
FIG. 9 illustrates an exemplary implementation of the present method to assist with airplane towing and maneuvering.

In the example of FIG. 9, temporary CCTV video cameras C1, C2 are located at each wing of an aircraft "A". When the aircraft is "A" engaged by a tug or dolly "T", a tow sensor automatically activates the cameras and displays their associated viewing area in realtime to the tug or dolly operator (or other user) on the display screen of tablet 90. Each camera C1, C2 may also be selectively manually activated by clicking an icon tab 91, 92 on the tablet's display screen.

Figure 10:
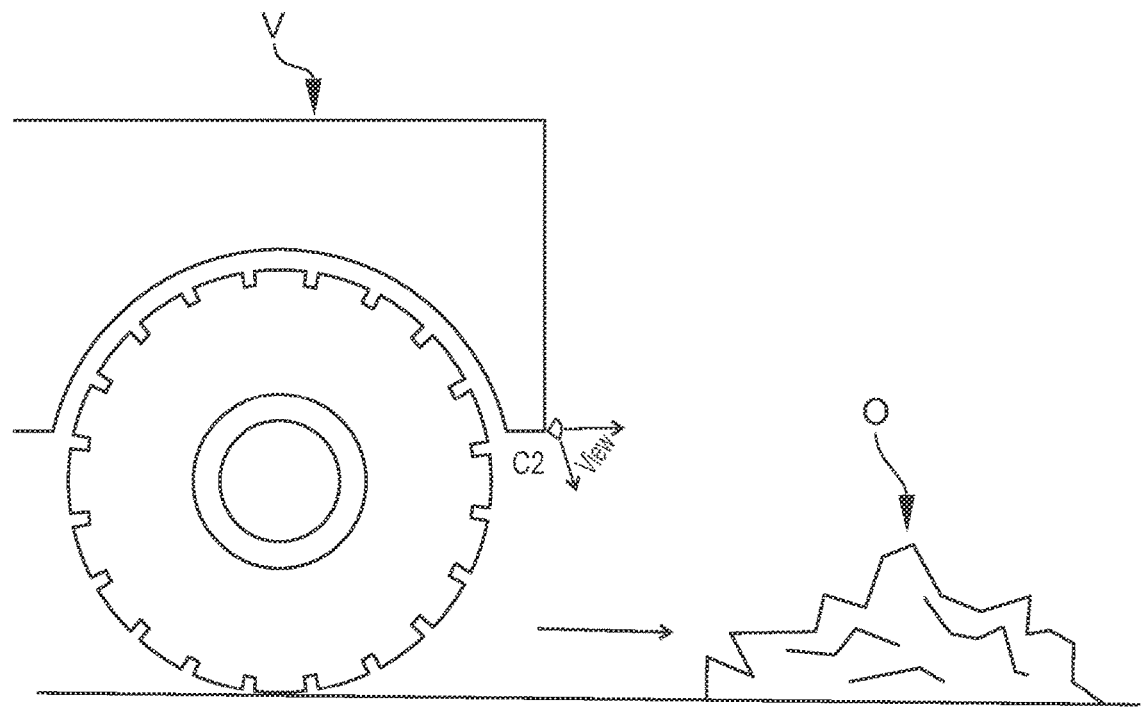
FIG. 10 illustrates an exemplary implementation of the present method to assist with reversing and maneuvering a heavy duty mining vehicle.
Figure 10:
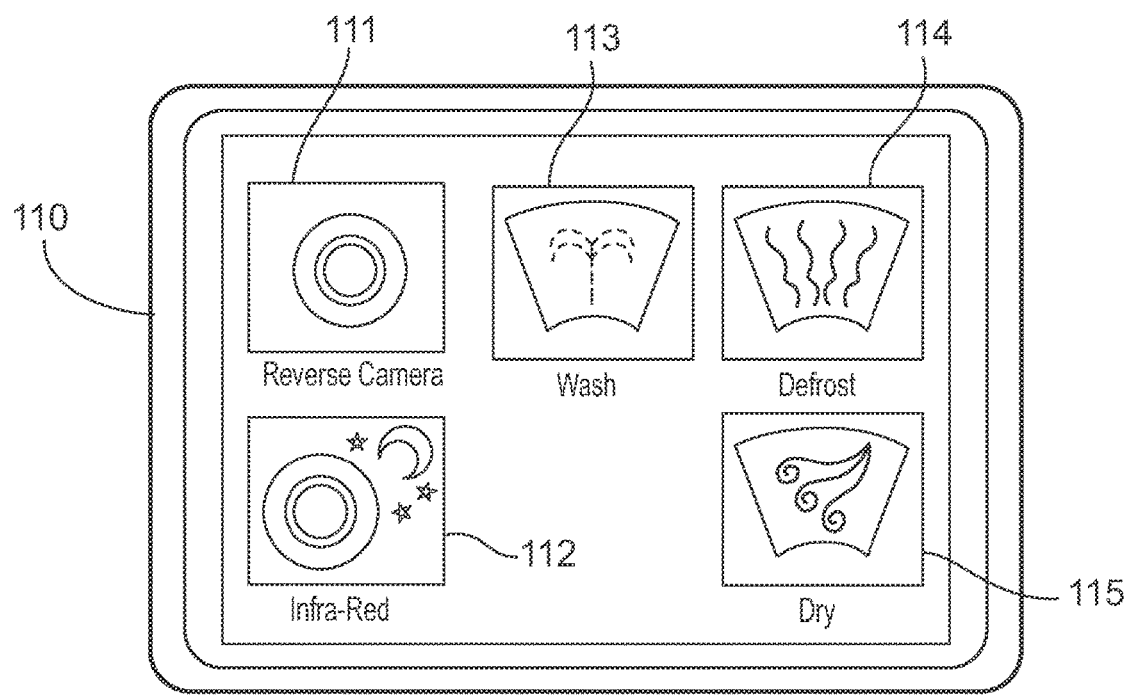

In the example of FIG. 10, a CCTV video camera C1 is mounted proximate the rear bumper of a mining vehicle "V" (or other construction vehicle). As the vehicle "V" approaches an obstacle "O", a distance sensor automatically activates the camera C1 and displays a rearward viewing area in realtime to the driver (or other use) on the display screen of tablet 110. Alternatively, the camera C1 may be automatically activated upon movement of the vehicle transmission into the reverse gear. The camera may also be selectively manually activated by clicking an icon tab 111 on the tablet's display screen. Additional icon tabs 112, 113, 114, 115 may be provided and clicked to enable infrared viewing, to activate a camera wash system, to activate a camera defrost system, and to activate a camera drying system.

Other Exemplary Implementations

In addition to the examples above, the present method may be implemented in numerous other vehicle-related scenarios. For example, in the event of a vehicle accident causing one or more air bags to deploy, an air bag sensor may trigger automatic activation of all cameras mounted on the vehicle to capture and record realtime data at the scene.

In another example, a fuel tank sensor may trigger automatic activation of an exterior camera proximate the fuel tank. This camera may be used to verify and/or authorize vehicle refueling. The fueling process may be viewed by a remote administrator in realtime on any web-enabled computer.

In yet another example, an engine starter sensor may trigger automatic activation of an interior cabin camera proximate the driver's seat. This camera may capture and record the driver's facial image, and may incorporate facial recognition technology to verify and authorize vehicle operation. Once activated, the camera may be viewed by a remote administrator in realtime on any web-enabled computer.

In yet another example, sensors are located at the rear door of the vehicle trailer and are operatively paired with one or more trailer-mounted cameras. When the door is opened, the sensors cause the cameras to automatically activate and display their viewing area in realtime on the user's tablet display screen.

In other examples, the present method may employ sensors connected to the vehicle steering wheel, ABS braking system, speedometer, lights, and turn signals which selectively activate respective paired cameras. The activated cameras automatically display their viewing area in realtime on the driver's tablet display screen to facilitate vehicle operation and maneuvering.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A method for enhancing situational awareness in a transportation vehicle comprising a tractor and a trailer, the trailer having a rear door, said method comprising:
    locating a plurality of cameras on the trailer of the vehicle;
    pairing the cameras with a computing device located inside the tractor, the computing device comprising a display screen and graphical interface with icon tabs representing each of the connected cameras;
    using the icon tabs rendered on the display screen of the computing device, manually activating a selected camera to display an associated viewing area captured by the camera; and
    upon a triggering event initiated by opening the rear door of the trailer, automatically activating at least one of the cameras to display an associated viewing area on the display screen of the computing device.

* * * * *